(12) United States Patent
Bartholet et al.

(10) Patent No.: US 8,294,111 B2
(45) Date of Patent: Oct. 23, 2012

(54) DOSIMETER AND ASSOCIATED METHOD OF MEASURING RADIATION

(75) Inventors: William G. Bartholet, Issaquah, WA (US); Dorina L. Hester, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 12/541,545

(22) Filed: Aug. 14, 2009

(65) Prior Publication Data

US 2011/0036987 A1 Feb. 17, 2011

(51) Int. Cl.
*G01T 1/02* (2006.01)

(52) U.S. Cl. .................................. 250/370.07; 250/371

(58) Field of Classification Search ............. 250/370.07, 250/371

See application file for complete search history.

(56) References Cited

U.S. PATENT DOCUMENTS

| | | | | |
|---|---|---|---|---|
| 4,678,916 A | * | 7/1987 | Thomson | 250/370.07 |
| 5,929,448 A | * | 7/1999 | Zimmerman | 250/370.07 |
| 2003/0042513 A1 | * | 3/2003 | Tichauer et al. | 257/270 |

OTHER PUBLICATIONS

K.P. Ray, E.G. Mullen, W.J. Stapor, R.R. Circle, and P.T. McDonald, "CRRES Dosimetry Results and Comparisons Using the Space Radiation Dosimeter and P-Channel MOS Dosimeters." IEEE Transactions on Nuclear Science, vol. 39, issue 6 (Dec. 1992) pp. 1846-1850.*

Andrew Holmes-Siedle, Federico Ravotti, Maurice Glaser, *The Dosimetric Performance of RADFETs in Radiation Test Beams*, IEEE, 1-4244-1464-4/07, ©2007.

REM Oxford at www.radfet.com, http://www.radfet.com/index.html (visited Aug. 5, 2009).

* cited by examiner

*Primary Examiner* — Constantine Hannaher
(74) *Attorney, Agent, or Firm* — Alston & Bird LLP

(57) ABSTRACT

A dosimeter and an associated method for detecting radiation are provided. A dosimeter includes a complementary pair of transistors, such as a first transistor that is doped in accordance with a first conductivity type, such as an n-doped metal oxide semiconductor field effect transistor (MOSFET) and a second transistor that is doped in accordance with a second conductivity type, different than the first conductivity type, such as a p-doped MOSFET. The first and second transistors may be configured to generate respective outputs that shift in opposite directions in response to radiation. The dosimeter may also include a circuit element configured to determine a measure of the radiation based upon a difference between the respective outputs of the first and second transistors. The circuit element may include an amplifier configured to amplify the difference between the respective outputs of the first and second transistors.

22 Claims, 3 Drawing Sheets

DOSIMETER AND ASSOCIATED METHOD OF MEASURING RADIATION

FIELD

Embodiments of the present disclosure relate generally to dosimeters and associated methods of measuring radiation and, more particularly to dosimeters that utilize transistors having different conductivity types in order to determine a measure of the radiation.

BACKGROUND

It is desirable to be able to detect and measure ionizing radiation in various instances. For example, space and air vehicles may desire to detect and measure radiation to assist, for example, in the avoidance of radiation exposure. Additionally, terrestrial applications, such as various security applications, may desire to detect and measure radiation, either to assist in the avoidance of radiation exposure or otherwise.

Geiger counters are conventionally utilized to detect and measure radiation. While functional, Geiger counters may be relatively expensive which may curtail their widespread use. In addition, Geiger counters may be considered relatively sizeable with their size also serving to limit the applications that may be effectively served by Geiger counters.

RADiation-sensitive Field Effect Transistors (RADFETs) have also been developed to detect radiation. A RADFET is a p-channel enhancement metal oxide semiconductor field effect transistor (MOSFET) that is specifically designed to respond to doses of ionizing radiation. Further details regarding RADFETs are provided, for example, by Holmes-Siedle, Ravotti and Glazer, "*The Dosimetric Performance Of Radfets In Radiation Test Beams*", IEEE Nuclear and Space Radiation Effects Data Workshop, July 2007. RADFETs generally have a relatively large starting voltage. Upon exposure to radiation, the output of a RADFET shifts or alters from the relatively large starting voltage by a relatively small amount. In an effort to facilitate the measurement of the amount by which the output of a RADFET has shifted and, in turn, the amount of radiation to which the RADFET was exposed, the output of a RADFET may be amplified. The amplified output is limited, however, to a value no greater than the supply voltage utilized for the amplifier. Since the amplification of the output of the RADFET amplifies not only the change in the RADFET's output that is occasioned as a result of the exposure to radiation, but also relatively large starting voltage, the output of a RADFET may not be amplified as much as desired in some applications.

As a result of the relatively small change in the output of a RADFET upon the exposure to radiation and the limitations upon the amplification of the change, the sensitivity with which RADFETs may detect incident radiation may be somewhat limited and, at least for some applications, may be less than desired. The relatively small magnitude of the change in the output of a RADFET in response to the exposure to radiation may also require relatively complex detection and measurement circuitry to be required in order to detect changes in the output of a RADFET in response to exposure to radiation. This detection and measurement circuitry may disadvantageously increase the cost of a dosimeter that relies upon RADFET technology.

It may therefore be desirable to develop an improved dosimeter that may have a relatively small form factor and may be more economical, while offering improved sensitivity relative to at least some of the existing dosimeters.

SUMMARY

An improved dosimeter and an associated method for detecting radiation are therefore provided according to embodiments of the present disclosure. In one embodiment, the dosimeter and associated method provide the measure of the incident radiation in such a manner that the incident radiation can be measured with enhanced sensitivity. In addition, the dosimeter and associated method of one embodiment are configured such that the dosimeter may have a relatively small form factor and may be quite economical, thereby facilitating more widespread usage.

In one embodiment, a dosimeter is provided that includes a first transistor that is doped in accordance with a first conductivity type, such as an n-doped metal oxide semiconductor field effect transistor (MOSFET). The dosimeter of this embodiment also includes a second transistor that is doped in accordance with a second conductivity type, different than the first conductivity type. For example, the second transistor may be a p-doped MOSFET. The first and second transistors are configured to generate respective outputs that shift in opposite directions in response to radiation. The dosimeter also includes a circuit element configured to determine a measure of the radiation based upon a difference between the respective outputs of the first and second transistors. In one embodiment, the circuit element includes an amplifier configured to amplify the difference between the respective outputs of the first and second transistors. The dosimeter of one embodiment may also include a constant current source for providing a constant level of current to the first and second transistors.

The dosimeter may also include a resistive element in electrical communication with one of the first and second transistors. The resistive element of this embodiment is configured to alter the output of the transistor with which the resistive element is in electrical communication such that the respective outputs of the first and second transistors have a predefined relationship, such as by being equal, in the absence of radiation. The dosimeter of one embodiment may also include a temperature sensitive circuit in electrical communication with a respective one of the first and second transistors. The temperature sensitive circuit of this embodiment is configured to alter the output of the respective transistor with which the temperature sensitive circuit is in electrical communication. In this embodiment, the magnitude of the changes in the output of the respective transistor will match the magnitude of the changes in the output of the other transistor as the temperature of the first and second transistors changes.

In another embodiment, the method of measuring radiation is provided. The method provides a first transistor that is doped in accordance with a first conductivity type, such as an n-doped MOSFET. The method also provides a second transistor that is doped in accordance with a second conductivity type, different than the first conductivity type, such as a p-doped MOSFET. The method of this embodiment receives radiation with the first and second transistors and then generates respective outputs from the first and second transistors that shift in opposite directions in response to the radiation. The method also determines a measure of the radiation based upon a difference between the respective outputs of the first and second transistors. In one embodiment, the determination of the measure of the radiation includes amplifying the difference between the respective outputs of the first and second transistors. The method of one embodiment may also provide a constant level of current to the first and second transistors.

The method of one embodiment may also provide a resistive element in electrical communication with one of the first and second transistors. The method of this embodiment may also alter the output of the transistor with which the resistive element is in electrical communication such that the respective outputs of the first and second transistors have a predefined relationship in the absence of radiation. Additionally, or alternatively, the method of one embodiment may provide a temperature sensitive circuit in electrical communication with the respective one of the first and second transistors. The method of this embodiment may also alter the output of the respective transistor with which the temperature sensitive circuit is in electrical communication. As such, a magnitude of the changes in the output of the respective transistor will match the magnitude of the changes in the output of the other transistor as the temperature of the first and second transistors changes.

By providing a dosimeter and an associated method in which the measure of radiation is based upon a difference between the respective outputs of a pair of transistors, the measure of radiation that is generated in response to the exposure to radiation may be greater than in some conventional dosimeters so as to provide for enhanced sensitivity. Additionally, by basing the measure of the radiation upon the difference between the respective outputs of a pair of transistors and not upon a relatively small change that is made to a relatively large starting voltage, the measure of radiation may be more substantially amplified, thereby further increasing the magnitude of the measure of the radiation and further enhancing the sensitivity of the dosimeter and the associated method.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Figure 1:
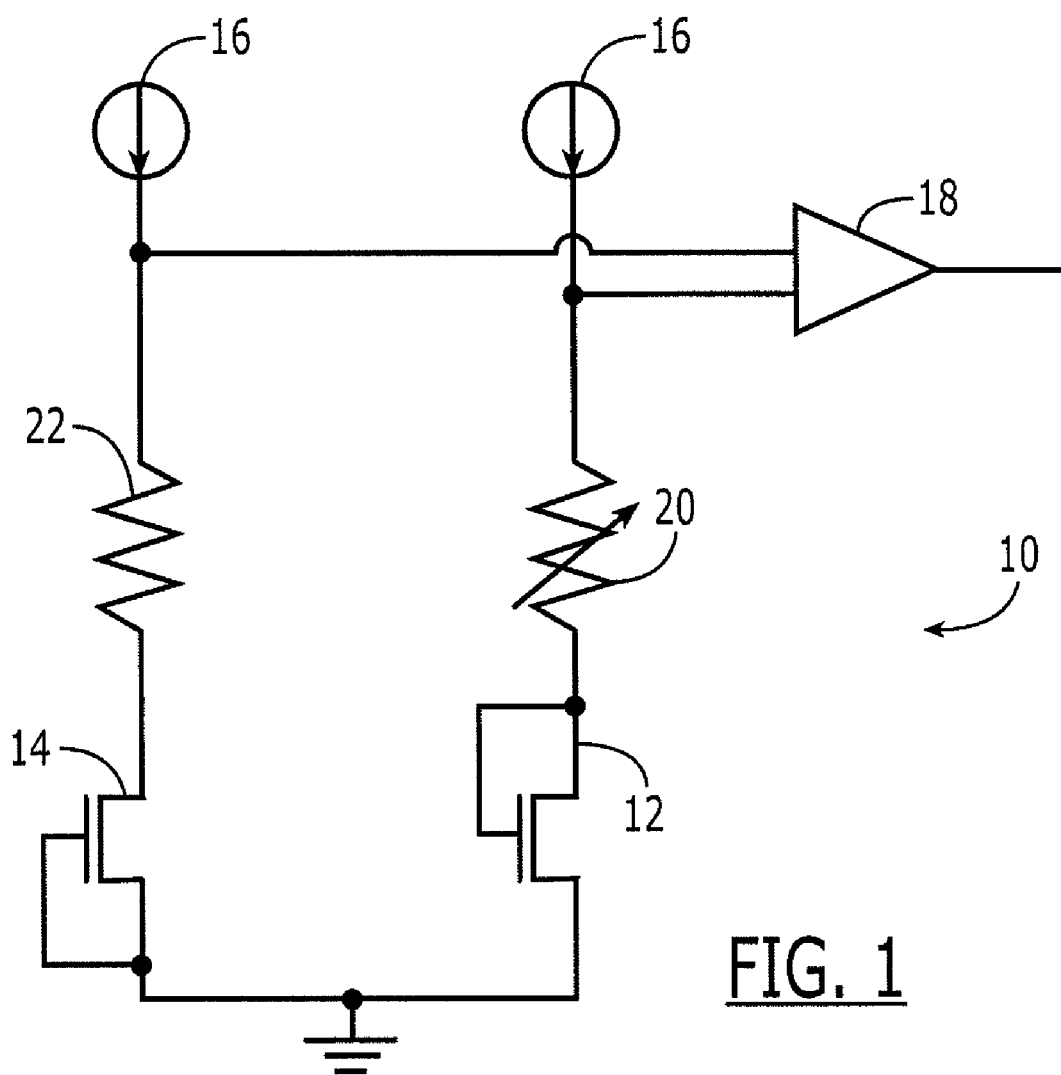
Figure 2:
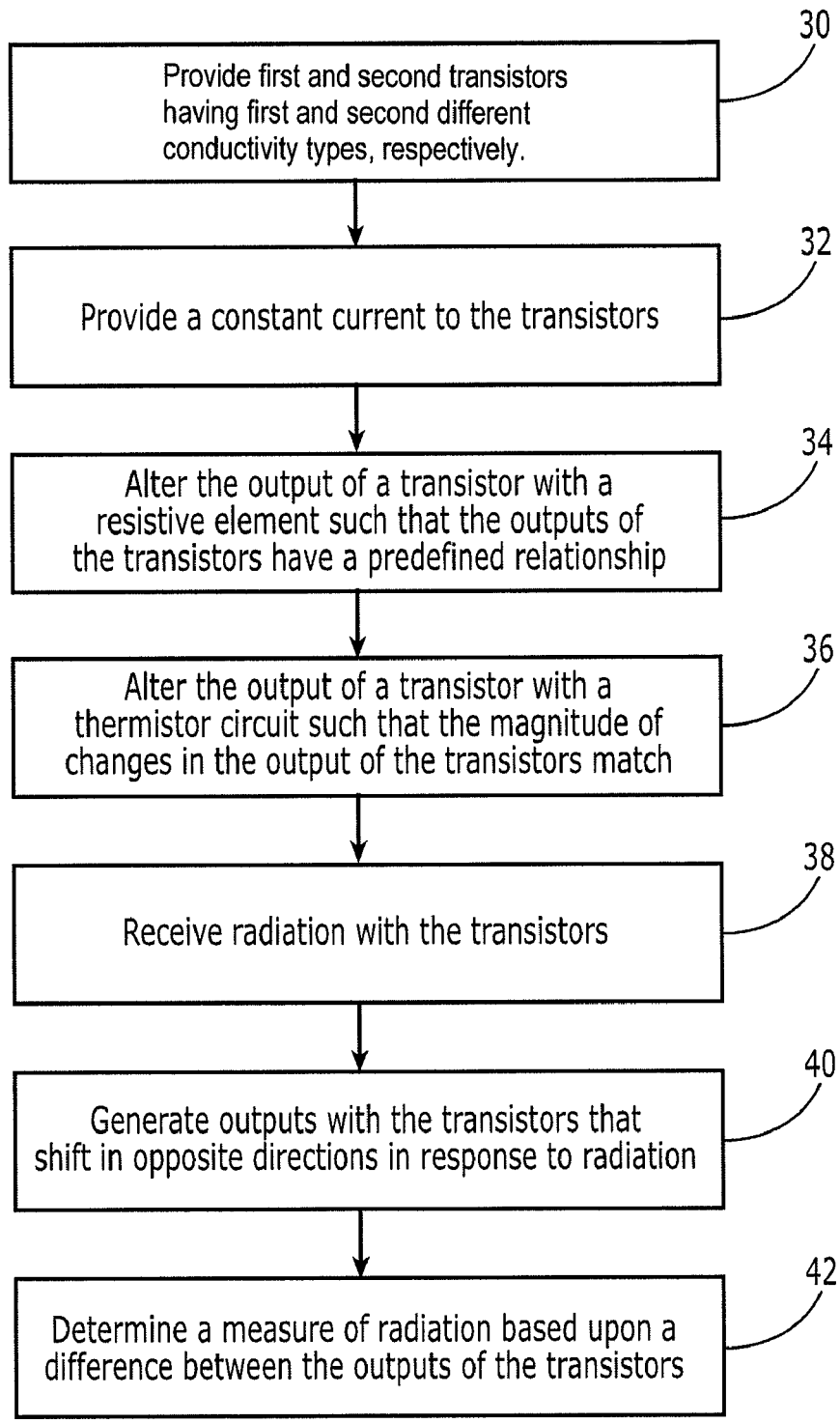
Figure 3:
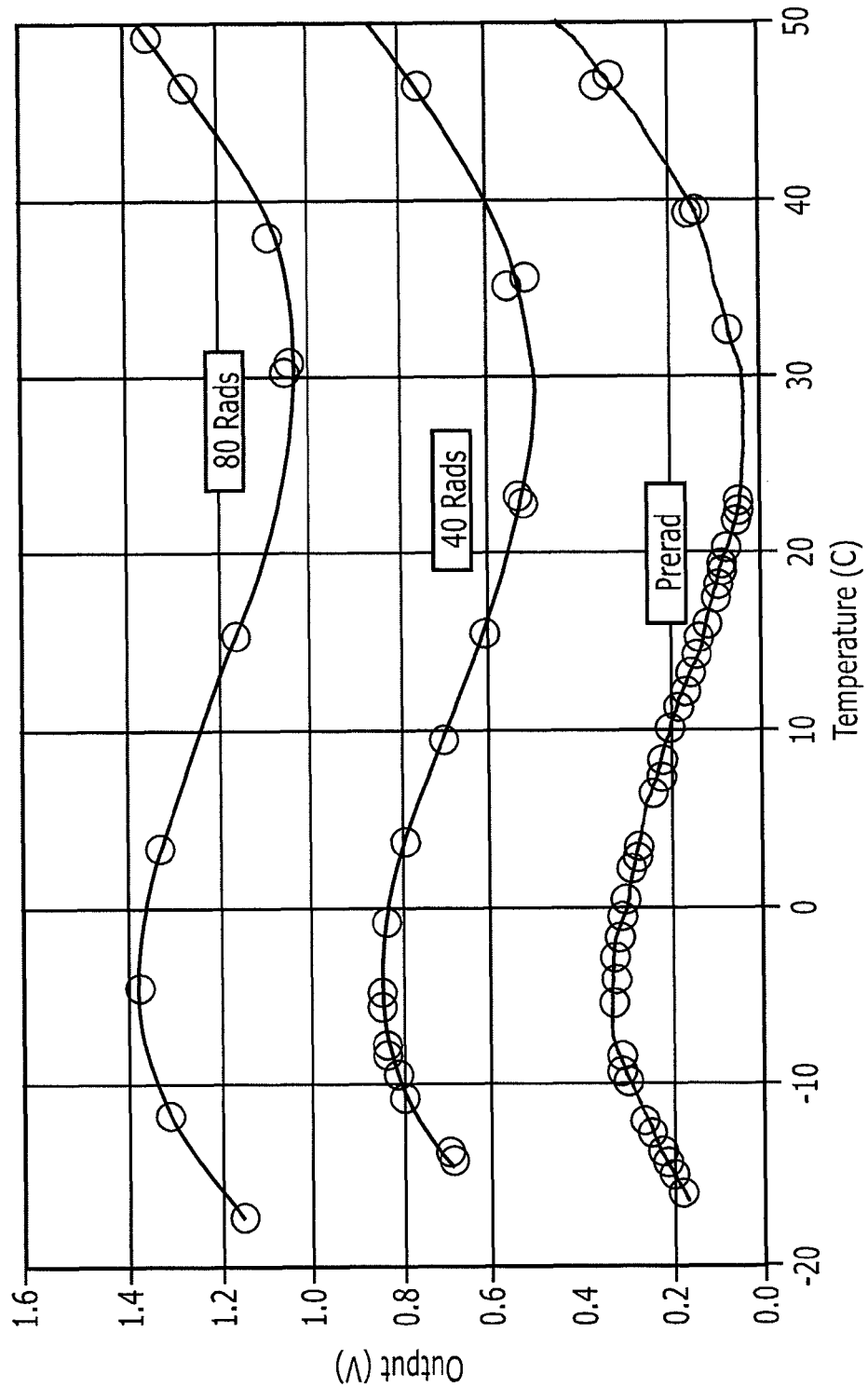

Having thus described the disclosure in general terms, reference will now be made to the accompanying drawings, which are not necessarily drawn to scale, and wherein:

FIG. 1 is a diagram of a dosimeter in accordance with one embodiment of the present disclosure;

FIG. 2 is a flow chart illustrating the operations performed in accordance with a method of one embodiment of the present disclosure; and FIG. 3 is a graphical representation of the output of a dosimeter in accordance with one embodiment of the present disclosure in response to different levels of radiation exposure at different temperatures.

DETAILED DESCRIPTION

The present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

According to embodiments of the present disclosure, a dosimeter 10 is provided in order to provide a measure of the radiation to which the dosimeter is exposed. As such, the dosimeter may be employed in a wide variety of applications including onboard space vehicles and air vehicles in order to detect potential exposure to radiation by crew members, passengers, cargo, or the like. Additionally, the dosimeter of embodiments of the present disclosure may be utilized in a variety of terrestrial applications to detect the potential exposure to radiation.

As shown in FIG. 1, the dosimeter 10 includes first and second transistors 12, 14. The first and second transistors may be a pair of complementary transistors and, as such, may be doped in accordance with first and second conductivity types, respectively. In this regard, the first and second conductivity types are different. As such, the first transistor 12 may be an n-doped transistor, while the second transistor 14 may be a p-doped transistor. The dosimeter may utilize a variety of different types of transistors, although the particular dosimeter generally includes first and second transistors of the same general type, albeit of different conductivity types. In the illustrated embodiment, for example, the first and second transistors are MOSFETs. In this embodiment, the gate oxide layer of the MOSFETs is generally sufficiently thick to provide the sensitivity desired for the application, since the sensitivity of the MOSFET will generally vary directly with the thickness of the gate oxide layer with a thicker oxide layer providing enhanced sensitivity and a thinner oxide layer providing decreased sensitivity. Also, the gate oxide layer of the MOSFETs of this embodiment is generally sufficiently thick to avoid annealing at room temperature due to the tunneling of electrons into the gate oxide layer since such annealing may otherwise disadvantageously cause the signal to fade over time. In one embodiment, for example, the gate oxide layer may have a thickness of at least 100 Angstroms. However, the gate oxide layer may have other minimum thicknesses in other embodiments, if so desired.

The dosimeter 10 may also include constant current sources 16, one of which is associated with each of the first and second transistors 12, 14 in order to provide a flow of current through a respective transistor to ground. As such, the transistors are generally configured to be in parallel between the constant current sources and ground as shown in FIG. 1. The constant current sources are configured to provide a flow of current, such as 390 microamps, that is sufficient to bias the respective transistor such that the transistors remain operational within the linear region in response to exposure to the anticipated levels of radiation so as to insure that the respective transistors appropriately respond to radiation by altering their outputs without becoming saturated. The constant current sources of one embodiment are also configured to provide a flow of current sufficient to bias the transistors to an operational regime in which the transistors will have a reduced temperature variation.

In the absence of radiation, each transistor provides predefined output in response to the current flow therethrough as provided by the respective constant current source 16. As described below, the first and second transistors 12, 14 of the dosimeter 10 of one embodiment are configured such that their outputs have a predefined relationship in the absence of radiation, such as with the output of each transistor having the same value, such as zero, or otherwise being within the predefined range of one another. In response to radiation, however, the output of each transistor changes. By utilizing a pair of complementary transistors that have opposite conductivity types, the outputs of the first and second transistors change or vary in response to radiation in opposite manners. For example, the output of the first transistor may increase in response to the exposure to radiation, while the output of the second transistor may decrease in response to the exposure to the same radiation. In the embodiment in which both transistors have an output of zero volts in the absence of radiation, the first transistor may provide a positive voltage in response to the exposure to radiation, while the second transistor may provide a negative voltage in response to the exposure to the same radiation.

The dosimeter 10 of one embodiment also includes a circuit element configured to determine a measure of radiation based upon a difference between the respective outputs of the first and second transistors 12, 14. In the illustrated embodiment, the circuit element is embodied as an amplifier 18 that receives the outputs of the first and second transistors and that amplifies the difference therebetween. By utilizing a pair of transistors having outputs that vary in opposite directions in response to the exposure to radiation and by determining a measure of the radiation based upon the difference between the respective outputs of the first and second transistors, the measure of the radiation that is generated by the dosimeter of embodiments of the present disclosure may be larger than that generated by a RADFET when exposed to the same level of radiation since the RADFET generates an output based upon the change in the output of a single transistor.

Additionally, the voltage level that is being amplified is a voltage level representative of the difference between the respective outputs of the first and second transistors 12, 14. Although this difference is generally larger than the change in the output of a RADFET in response to exposure to the same radiation, this difference remains a relatively small voltage since the voltage difference is not built upon a relatively large starting voltage as in the case of a RADFET. As such, the difference may be substantially amplified by the amplifier 18, such as a differential voltage amplifier embodiment, for example by a low noise, low offset operational amplifier. In this regard, the relatively large amount of amplification may be provided by the amplifier 18 of one embodiment since the relatively small difference that is being amplified can be substantially amplified without causing the output of the amplifier to reach or attempt to exceed the magnitude of the supply voltage, which effectively defines the maximum amount of amplification provided by the amplifier. In this regard, the amplifier may include a 0 volt and a 5 volt supply voltage such that a relatively small difference value such as 4 mV, can be multiplied by a predetermined amplification factor of 1000 without exceeding the magnitude of the supply voltage, e.g., 5 volts. In contrast, the output of a RADFET that is amplified is not only the relatively small change that occurred in the output in response to the exposure to radiation, but also the relatively large starting voltage. As such, the amount of amplification of the output of a RADFET is generally substantially more limited than that provided in accordance with embodiments of the present disclosure.

As noted above, the outputs of the first and second transistors 12, 14 in the absence of radiation are generally the same or at least within a predefined range of one another. In order to facilitate the outputs of the first and second transistor having a predefined relationship, such as being identical or at least within a predefined range of one another in the absence of radiation, the dosimeter 10 of one embodiment may include a resistive element 20, such as a potentiometer, in electrical communication with one of the first and second transistors. In the illustrated embodiment, for example, a potentiometer is connected in line between the constant current source 16 and the n-MOS transistor. The resistive element is configured to alter the output of the transistor with which the resistive element is in electrical communication. As such, the resistant value provided by the potentiometer may be adjusted until the respective outputs of the first and second transistors in the absence of radiation have a predefined relationship. For example, the resistive value provided by the potentiometer may be adjusted until the respective outputs of the first and second transistors are identical to one another in the absence of radiation.

By utilizing a complementary pair of transistors, the dosimeter 10 provides for first order temperature compensation. However, the dosimeter of one embodiment of the present disclosure may include a temperature sensitive circuit 22, such as a thermistor circuit, as depicted in FIG. 1 to provide for second order temperature compensation, thereby further improving the performance of the dosimeter. In the illustrated embodiment, for example, the dosimeter 10 also includes a temperature sensitive circuit in electrical communication with a respective one of the first and second transistors 12, 14. While the dosimeter 10 of the illustrated embodiment depicts the temperature sensitive circuit to be in electrical communication with the opposite or other transistor from that with which the resistive element 20 is in electrical communication, both the resistive element and the temperature sensitive circuit could be in electrical communication with the same transistor. Additionally, the dosimeter may include only one of the resistive element or the temperature sensitive circuit or may include both the resistive element and the temperature sensitive circuit as depicted in the embodiment of FIG. 1. As shown in the example of FIG. 1, the temperature sensitive circuit may be positioned in line between the constant current source 16 and the p-MOS transistor. The temperature sensitive circuit is configured to alter the output of the respective transistor with which the temperature sensitive circuit is in electrical communication. In particular, the temperature sensitive circuit is configured to provide different predefined resistance levels at different temperatures such that the magnitude of changes in the output of the respective transistor with which the temperature sensitive circuit is in electrical communication match, e.g., equal, of magnitude of the changes in the output of the other transistor as the temperature to which the first and second transistors are exposed changes. Although the temperature sensitive circuit facilitates the matching or equalization of the magnitude of the outputs of the pair of transistors as the temperature changes, the outputs of the pair of transistors still vary in opposite directions, generally by equal but opposite amounts, in response to the exposure to radiation.

In operation, a dosimeter 10 may be provided with a complementary pair of transistors and with a constant level of current being provided to both the first and second transistors 12, 14. See operations 30 and 32 of FIG. 2. The dosimeter and, in particular, the first and second transistors may then be exposed to radiation and, in response, the first and second transistors may generate respective outputs that shift in opposite directions in response to the radiation. See operations 38 and 40 of FIG. 2. The measure of the radiation may then be determined based upon a difference between the respective outputs of the first and second transistors. See operation 42. In this regard, the measure of the radiation may be determined by amplifying the difference between the respective outputs of the first and second transistors.

In order to controllably establish the respective outputs of the first and second transistors 12, 14 in the absence of radiation, a resistor circuit 20 may be provided in electrical communication with one of the transistors such that the output of the transistor with which the resistive element is in electrical communication may be altered in order for the respective outputs of the transistors to have a predefined relationship, such as by being equal or being within a predefined range of one another, in the absence of radiation. See operation 34 of FIG. 2. Additionally, or alternatively, a temperature sensitive circuit 22 may also be provided that is in electrical communication with the respective one of the first and second transistors such that the output of the respective transistor with which the temperature sensitive circuit is in electrical communication is altered as the temperature to which the transistors are exposed varies. See operation 36 of FIG. 2. As such, the magnitude of the changes in the output of the respective transistor may match the magnitude of the changes in the output of the other transistor as the temperature to which the first and second transistors are exposed changes.

By way of example, a dosimeter 10 in accordance with one embodiment of the present disclosure that includes a temperature sensitive circuit 22 for providing second order temperature compensation was evaluated over a range of temperatures from about −20° C. to about 50° C. In this regard, the output of the dosimeter over this temperature range in the absence of radiation (designated Prerad), in response to exposure to 40 rads of radiation and in response to 80 rads of radiation was evaluated and is depicted in FIG. 3. As illustrated, the dosimeter of this embodiment had a sensitivity of approximately 12.5 mV/rad over this relatively large temperature range. Although the dosimeter could have been constructed so as to have increased sensitivity, such as 150 mV/rad or more, the dosimeter of this embodiment still had a substantially greater sensitivity than a number of conventional RADFET dosimeters which have a sensitivity generally on the order of about 1 mV/rad. Moreover, the utilization of relatively inexpensive transistors, such as p-MOS and n-MOS transistors, provide for a relatively small form factor and a relatively economical design, while still providing enhanced performance as shown, for example, in FIG. 3.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dosimeter comprising:
a first transistor that is doped in accordance with a first conductivity type;
a second transistor that is doped in accordance with a second conductivity type, different than the first conductivity type, wherein the first and second transistors are provided with a supply voltage and are configured to generate respective outputs that shift in opposite directions in response to radiation, wherein the first and second transistors are also configured to generate respective outputs that have a predefined relationship in an absence of radiation; and
a circuit element comprising an amplifier configured to amplify a difference between the respective outputs of the first and second transistors in order to determine a measure of the radiation, wherein the amplifier is configured to amplify the difference between the respective outputs of the first and second transistors so as to generate an output that permits radiation detection while remaining less than the supply voltage.

2. A dosimeter according to claim 1 further comprising a resistive element in electrical communication with one of the first and second transistors, the resistive element configured to alter the output of the transistor with which the resistive element is in electrical communication such that the respective outputs of the first and second transistors have a predefined relationship in the absence of radiation.

3. A dosimeter according to claim 1 further comprising a temperature sensitive circuit in electrical communication with a respective one of the first and second transistors, wherein the temperature sensitive circuit is configured to alter the output of the respective transistor with which the temperature sensitive circuit is in electrical communication such that a magnitude of changes in the output of the respective transistor match a magnitude of changes in the output of the other transistor as a temperature of the first and second transistors changes.

4. A dosimeter according to claim 1 further comprising a constant current source for providing a constant level of current to the first and second transistors.

5. A dosimeter according to claim 1 wherein the first transistor comprises an n-doped metal oxide semiconductor field effect transistor (MOSFET) and the second transistor comprises a p-doped MOSFET.

6. A dosimeter according to claim 1 wherein the first and second transistors have a gate oxide layer with a thickness of at least 100 Angstroms.

7. A dosimeter according to claim 1 wherein the first and second transistors are configured to generate respective outputs that are within a predefined range of one another in the absence of radiation.

8. A dosimeter according to claim 7 wherein the first and second transistors are configured to generate respective outputs having a same value in the absence of radiation.

9. A dosimeter comprising:
a first transistor that is doped in accordance with a first conductivity type;
a second transistor that is doped in accordance with a second conductivity type, different than the first conductivity type, wherein the first and second transistors are provided with a supply voltage and are configured to generate respective outputs that shift in opposite directions in response to radiation, wherein the first and second transistors are also configured to generate respective outputs that have a predefined relationship in an absence of radiation;
a resistive element in electrical communication with one of the first and second transistors, the resistive element configured to alter the output of the transistor with which the resistive element is in electrical communication such that the respective outputs of the first and second transistors have a predefined relationship in the absence of radiation;
a temperature sensitive circuit in electrical communication with a respective one of the first and second transistors, wherein the temperature sensitive circuit is configured to alter the output of the respective transistor with which the temperature sensitive circuit is in electrical communication such that a magnitude of changes in the output of the respective transistor match a magnitude of changes in the output of the other transistor as a temperature of the first and second transistors changes; and
a circuit element comprising an amplifier configured to amplify a difference between the respective outputs of the first and second transistors in order to determine a measure of the radiation, wherein the amplifier is configured to amplify the difference between the respective outputs of the first and second transistors so as to generate an output that permits radiation detection while remaining less than the supply voltage.

10. A dosimeter according to claim 9 further comprising a constant current source for providing a constant level of current to the first and second transistors.

11. A dosimeter according to claim 9 wherein the first transistor comprises an n-doped metal oxide semiconductor field effect transistor (MOSFET) and the second transistor comprises a p-doped MOSFET.

12. A dosimeter according to claim 9 wherein the first and second transistors have a gate oxide layer with a thickness of at least 100 Angstroms.

13. A dosimeter according to claim 9 wherein the first and second transistors are configured to generate respective outputs that are within a predefined range of one another in the absence of radiation.

14. A dosimeter according to claim 13 wherein the first and second transistors are configured to generate respective outputs having a same value in the absence of radiation.

15. A method of measuring radiation comprising:
providing a first transistor that is doped in accordance with a first conductivity type and a second transistor that is doped in accordance with a second conductivity type, different than the first conductivity type;
providing the first and second transistors with a supply voltage with the first and second transistors being configured to generate respective outputs that have a predefined relationship in an absence of radiation;
receiving radiation with the first and second transistors;
generating respective outputs from the first and second transistors that shift in opposite directions in response to the radiation; and
amplifying a difference between the respective outputs of the first and second transistors in order to determine a measure of the radiation, wherein amplifying comprises amplifying the difference between the respective outputs of the first and second transistors so as to generate an output that permits radiation detection while remaining less than the supply voltage.

16. A method according to claim 15 further comprising:
providing a resistive element in electrical communication with one of the first and second transistors; and
altering the output of the transistor with which the resistive element is in electrical communication such that the respective outputs of the first and second transistors have a predefined relationship in the absence of radiation.

17. A method according to claim 15 further comprising:
providing a temperature sensitive circuit in electrical communication with a respective one of the first and second transistors; and
altering the output of the respective transistor with which the temperature sensitive circuit is in electrical communication such that a magnitude of changes in the output of the respective transistor match a magnitude of changes in the output of the other transistor as a temperature of the first and second transistors changes.

18. A method according to claim 15 further comprising providing a constant level of current to the first and second transistors.

19. A method according to claim 15 wherein providing the first transistor comprises providing an n-doped metal oxide semiconductor field effect transistor (MOSFET) and wherein providing the second transistor comprises providing a p-doped MOSFET.

20. A method according to claim 15 wherein providing the first and second transistors comprises providing the first and second transistors having a gate oxide layer with a thickness of at least 100 Angstroms.

21. A method according to claim 15 wherein providing the first and second transistors with a supply voltage comprises generating respective outputs from the first and second transistors that are within a predefined range of one another in the absence of radiation.

22. A method according to claim 21 wherein providing the first and second transistors with a supply voltage comprises generating respective outputs from the first and second transistors that have a same value in the absence of radiation.

* * * * *